United States Patent
Wang et al.

(10) Patent No.: US 7,438,061 B2
(45) Date of Patent: Oct. 21, 2008

(54) METHOD AND APPARATUS FOR ESTIMATING EXHAUST PRESSURE OF AN INTERNAL COMBUSTION ENGINE

(75) Inventors: Yue-Yun Wang, Troy, MI (US); Anupam Gangopadhyay, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 76 days.

(21) Appl. No.: 11/466,114

(22) Filed: Aug. 22, 2006

(65) Prior Publication Data
US 2008/0051973 A1     Feb. 28, 2008

(51) Int. Cl.
*F02B 33/00* (2006.01)
*F02M 25/07* (2006.01)

(52) U.S. Cl. .............................. 123/559.1; 123/568.11; 701/101

(58) Field of Classification Search ......... 701/101–104; 123/559.1, 559.2, 568.11; 73/117.3, 118.1, 73/118.2
See application file for complete search history.

(56) References Cited

U.S. PATENT DOCUMENTS

| | | | |
|---|---|---|---|
| 6,039,025 A * | 3/2000 | Iwano et al. | 123/399 |
| 6,298,299 B1 | 10/2001 | Itoyama et al. | |
| 6,354,084 B1 * | 3/2002 | McKinley et al. | 60/605.2 |
| 6,658,364 B2 | 12/2003 | Olin | |
| 6,732,522 B2 | 5/2004 | Wright et al. | |
| 6,845,753 B2 * | 1/2005 | Kotwicki | 123/406.26 |
| 6,980,902 B2 * | 12/2005 | Nakazawa | 701/102 |
| 7,139,655 B2 * | 11/2006 | Nakazawa et al. | 701/102 |

OTHER PUBLICATIONS

Kim, Y.W., Design of an IC Engine Torque Estimator Using Unknown Input Observer, Journal of Dynamic Systems, Measurement, and Control, Sep. 1999, pp. 487-495, vol. 121, ASME.

Muller, Martin, et al., Mean Value Modelling of Turbocharged Spark Ignition Engines, Feb. 1998, SAE Technical Paper 980784, SAE, Warrendale, PA, USA.

Anderson, Per, Comparison of Two Exhaust Manifold Pressure Estimation Methods, 3rd Computer Science and Engineering System Conf., May 2001, Linkopin, Sweden.

* cited by examiner

*Primary Examiner*—John T Kwon

(57) ABSTRACT

A method and apparatus are provided, comprising an internal combustion engine equipped with a variable geometry intake air compressing device and a control module operative to estimate exhaust gas pressure during ongoing engine operation. The control module is adapted to monitor sensing devices of the internal combustion engine, and is adapted to execute algorithms. The method comprises monitoring signal inputs from the sensing devices, and determining operating parameters for exhaust flow and an exhaust pressure of the intake air compressing device. An exhaust pressure ratio is determined based upon the parameters for exhaust flow and the exhaust pressure of the intake air compressing device. An exhaust pressure is determined based upon the exhaust pressure ratio.

14 Claims, 6 Drawing Sheets

METHOD AND APPARATUS FOR ESTIMATING EXHAUST PRESSURE OF AN INTERNAL COMBUSTION ENGINE

TECHNICAL FIELD

This invention pertains generally to internal combustion engines, and more specifically to estimating exhaust pressure thereof.

BACKGROUND OF THE INVENTION

Modern internal combustion engines are equipped with sophisticated systems to monitor and control various aspects of engine performance during ongoing operation, to meet operator demands for performance, including torque and fuel economy, and to satisfy government regulations related to emissions, safety, and fuel economy. Such systems include sensing devices and actuators connected to one or more control modules which execute computer programs to monitor and control engine operation during ongoing operation.

Exhaust pressure is an important parameter used by engine system designers. By way of illustration of a need for an accurate determination of exhaust pressure, emissions requirements have led to implementation of exhaust gas recirculation (EGR) systems combined with aftertreatment systems to reduce engine emissions. Control of exhaust gas recirculation requires an accurate determination of EGR mass flow. Such methods include calculating EGR flow from a gas flow equation through an orifice, and, determining a difference between charge air mass flow and fresh air mass flow. Both calculations use engine exhaust pressure as one of the input variables. Some engine manufacturers have implemented an exhaust pressure sensor to determine exhaust pressure.

There is a need to estimate exhaust pressure for an internal combustion engine, to accurately determine exhaust pressure without incurring additional costs associated with additional of sensing devices.

SUMMARY OF THE INVENTION

In accordance with an embodiment of the invention, there is provided a method and an apparatus to estimate exhaust gas pressure during ongoing operation of an internal combustion engine, e.g., an engine equipped with a variable geometry intake air compressing device and a control module. The control module is adapted to monitor sensing devices of the internal combustion engine, and is adapted to execute algorithms contained therein to estimate exhaust gas pressure. The method comprises monitoring signal inputs from the sensing devices, and determining operating parameters for exhaust flow and opening of the intake compressing device. An exhaust pressure ratio is determined based upon the parameters for exhaust flow and the opening of the intake air compressing device, and exhaust pressure is determined based upon the exhaust pressure ratio.

An aspect of the invention includes determining the exhaust pressure ratio based upon a plurality of selectively retrievable predetermined parameters for exhaust pressure ratio stored in tabular format, or alternatively, determined by execution of a polynomial equation.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
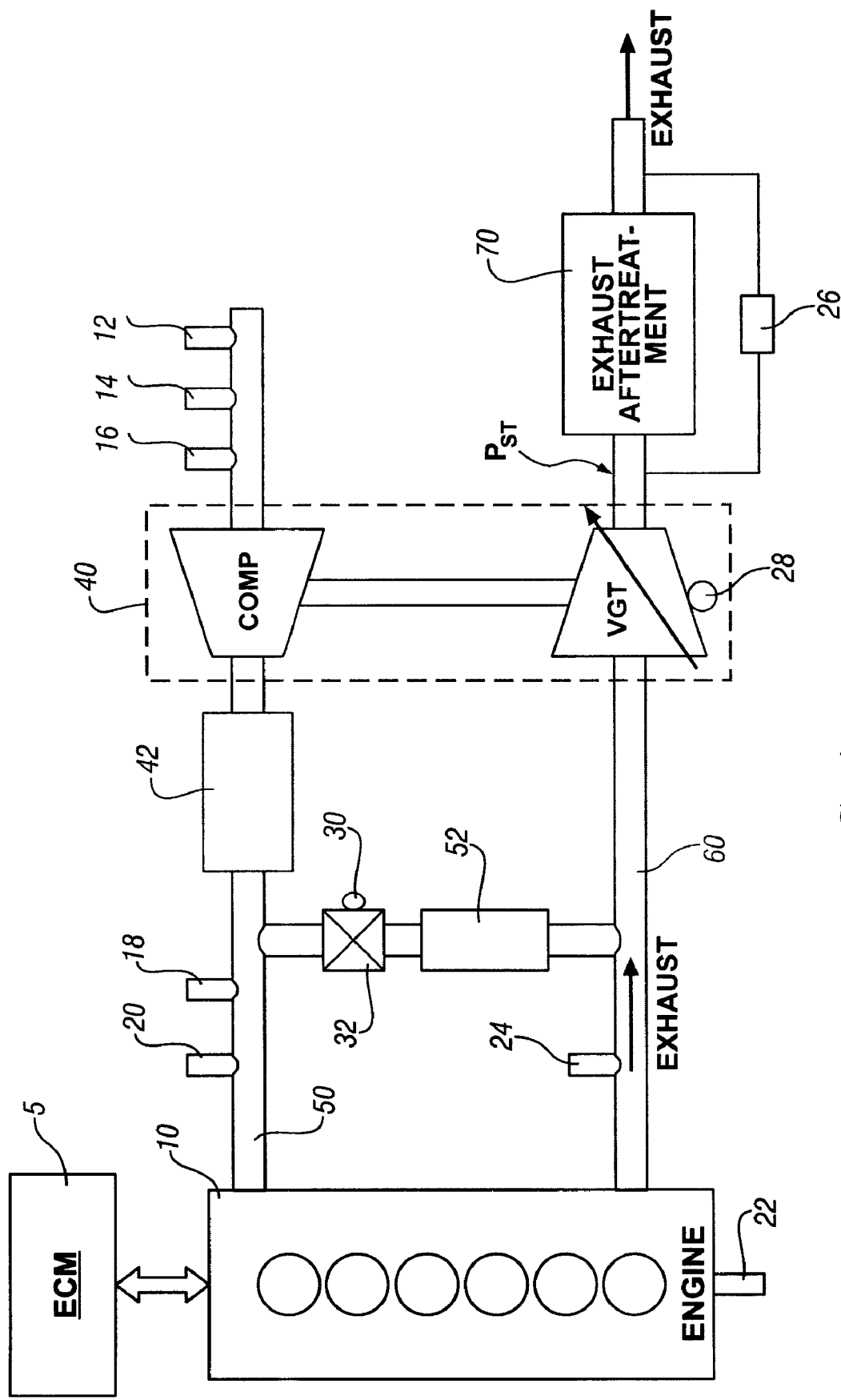
FIG. 1 is a schematic diagram of an exemplary engine system, in accordance with the present invention.

Referring now to the drawings, wherein the showings are for the purpose of illustrating the invention only and not for the purpose of limiting the same, FIG. 1 depicts an engine 10 and engine control module (ECM) 5 which has been constructed in accordance with an embodiment of the invention. The exemplary engine 10 comprises a conventional multi-cylinder internal combustion engine mechanized to operate in a compression-ignition configuration, although this invention is not meant to be limited to compression-ignition engine configurations. Engine system components include an intake air compressing device 40 comprising a variable geometry turbine device (VGT) and an air compressor (COMP), a charge air cooler 42, an exhaust gas recirculation (EGR) valve 32 and cooler 52, an intake manifold 50, and exhaust manifold 60, and an exhaust aftertreatment system 70, e.g., comprising an oxidation catalyst and a diesel particulate filter. Sensing devices are installed on the engine to monitor physical characteristics and generate signals which are correlatable to engine and ambient parameters. The sensing devices preferably comprise an ambient air pressure sensor 12, an ambient or intake air temperature sensor 14, and a mass air flow sensor 16, all which can be configured individually or as a single integrated device; an intake manifold air temperature sensor 18, and an intake manifold pressure sensor 20. There is an exhaust gas temperature sensor 24, a VGT position sensor 28 and an EGR valve position sensor 30. An engine speed sensor 22 monitors rotational speed of the engine. A pressure sensor 26 monitors a pressure drop across the exhaust aftertreatment system 70, which preferably includes monitoring pressure output of the VGT of the intake air compressing device 40, into the exhaust system. Each of the sensing devices is signally connected to the ECM 5 to provide signal information which is transformed by the ECM to information representative of the respective monitored parameter. It is understood that this configuration is illustrative, not restrictive, including the various sensing devices being replaceable within functional equivalent devices and algorithms and still fall within the scope of the invention. Furthermore, the intake air compressing device 40 can comprise turbocharger and supercharger devices within the scope of the invention.

The sensors are operative to provide parametric information, represented herein as follows:

$\dot{M}_a$ fresh mass air flow sensor 16
$T_{im}$ intake manifold temperature sensor 18
$P_{im}$ intake manifold pressure sensor 20
$T_{am}$ ambient temperature sensor 14
$P_{am}$ ambient pressure sensor 12
$T_{ex}$ exhaust temperature sensor 24
$VGT_p$ VGT position sensor 28
$EGV_p$ EGR valve position sensor 30
RPM engine speed sensor 22, and,
$\Delta P$ exhaust aftertreatment delta pressure sensor 26.

The ECM 5 is an element of an overall vehicle control system, preferably comprising a distributed control module architecture operable to provide coordinated system control. The ECM is operable to synthesize pertinent information and inputs from the aforementioned sensing devices, and execute algorithms to control various actuators to achieve control targets, including such parameters as fuel economy, emissions, performance, driveability, and protection of hardware, as described hereinbelow. The ECM 5 is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. A set of control algorithms, comprising resident program instructions and calibrations, is stored in ROM and executed to provide the respective functions of each computer. Algorithms are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using predetermined calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The invention comprises a method, preferably executed as one or more algorithms in the ECM 5, effective to estimate pressure in the exhaust system of an engine, e.g., the exemplary engine 10 illustrated and described herein. The method includes monitoring signal inputs from the sensing devices. Parameters for a corrected exhaust flow, a pressure at a turbine outlet of the intake air compressing device 40, $P_{st}$ (also referred to as stack pressure) and rotational speed, $N_t$, of the intake air compressing device 40 are determined. An exhaust pressure ratio is determined based upon the parameters comprising the corrected exhaust flow, the turbine outlet pressure of the intake air compressing device, the VGT position, and the rotational speed of the intake air compressing device. The exhaust pressure ratio is preferably determined from a calibration table stored in tabular form in a memory device in the ECM 5 comprising an array of predetermined pressure ratios. Alternatively, the exhaust pressure ratio is determined by execution of a polynomial equation executable by the ECM 5. Exhaust pressure is determined based upon the exhaust pressure ratio, in conjunction with a monitored pressure parameter, preferably a pressure determined at outlet pressure $P_{st}$ of the intake air compressing device 40. This is described in detail hereinafter.

An exemplary embodiment for utilization of exhaust gas pressure includes controlling and managing exhaust gas recirculation. Engine exhaust gas is re-circulated from the exhaust manifold 60 to the intake manifold 50 by either controlling EGR flow rate or intake charge oxygen concentration. Both controls require accurately estimating EGR mass flow for closed-loop feedback. The prior art teaches two common approaches to estimate EGR mass flow: one uses a gas flow equation through an orifice, the other estimates EGR flow as a difference between charge air mass flow and fresh air mass flow, as shown in below in Eqs. 1.1. and 1.2:

$$\dot{m}_{egr} = \phi(C.A.) \frac{P_{ex}}{\sqrt{R*T_{ex}}} f\left(\frac{P_{im}}{P_{ex}}\right), \text{ and,} \quad [1.1]$$

$$\dot{m}_{egr} = \dot{m}_{charge} - \dot{m}_a = \frac{P_{im}*RPM*D*\eta_v}{2RT_{im}} - \dot{m}_a \quad [1.2]$$

wherein in Eq. 1.1, R comprises the ideal gas constant; C comprises a discharge coefficient; and, A comprises EGR valve-affected area corrected by EGR cooler effect. In Eq. 1.2, D comprises engine displacement; $\eta_v$ comprises engine volumetric efficiency, which is also based upon engine exhaust pressure $P_{ex}$. With regard to either of equations 1.1 and 1.2 shown above, determining an accurate measurement of EGR flow is dependent upon accurately determining exhaust pressure.

The method for accurately determining exhaust pressure is now described, comprising an estimation of exhaust pressure based upon monitored operating conditions and predetermined calibrations as applied to physical laws. Using the first and second laws of thermodynamics, a map describing performance of a fixed geometry turbine can be reduced to an equation based upon four dimensionless groups, as follows in Eq. 2:

$$\frac{P_{ex}}{P_{st}}, \eta_T = f\left(\frac{\dot{M}_{ex}\sqrt{T_{ex}}}{P_{ex}}, \frac{N_t}{\sqrt{T_{ex}}}\right) \quad [2]$$

wherein:

$P_{st}$ comprises turbine out pressure, $\eta_T$ comprises turbine efficiency, $\dot{M}_{ex}$ comprises exhaust air mass flow comprising the sum of fresh air mass flow and fuel mass flow; and, $N_t$ comprises rotational speed of the intake air compressing device.

Each turbine vane position, Vp, is defined as Vp=VGTp, i.e., output of the VGT position sensor 28. Therefore, there exists a uniquely defined relation in Eq. 2 for fixed geometry turbines. With a variable geometry turbine, as described above, a new equation, similar to Eq. 2, is developed, comprising a map describing performance of a the variable geometry turbine, in Eq. 3:

$$\frac{\dot{M}_{ex}\sqrt{T_{ex}}}{P_{ex}} = f\left(\frac{P_{ex}}{P_{st}}, V_p, \frac{N_t}{\sqrt{T_{ex}}}\right). \quad [3]$$

Figure 2:
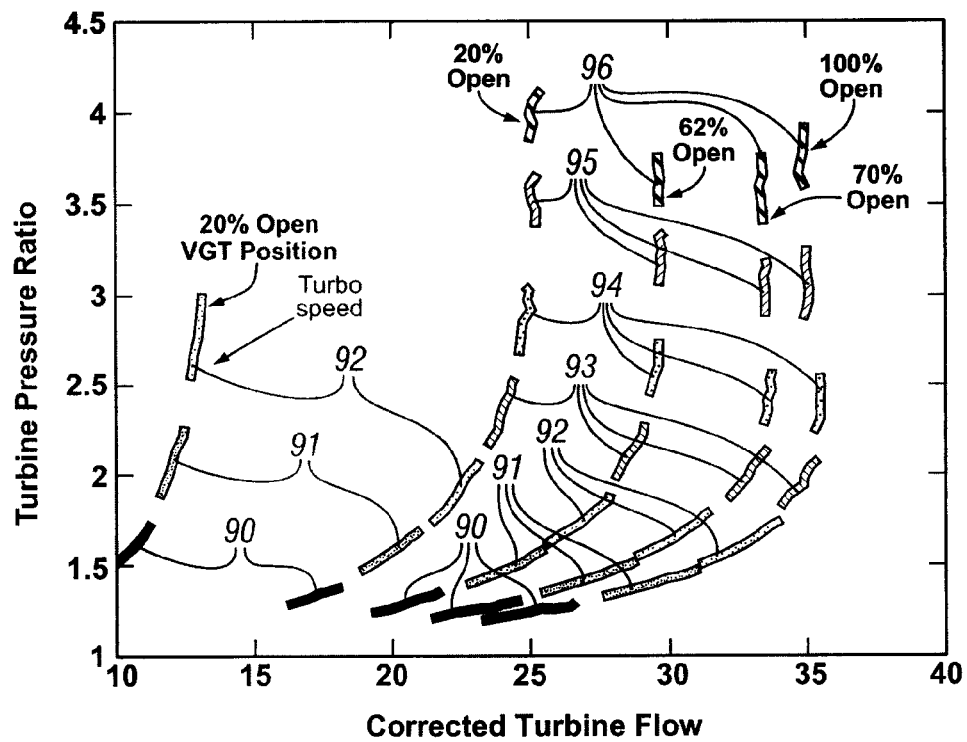
FIGS. 2 and 3 are graphical data depictions, in accordance with the present invention.

Referring now to FIG. 2 a turbine map is illustrated, wherein data points are graphed based upon Eq. 3 for the exemplary intake air compressing device in a system. In FIG. 2, the x-axis represents corrected turbine mass flow $$\frac{\dot{M}_{ex}\sqrt{T_{ex}}}{P_{ex}},$$

and, the y-axis represents turbine pressure ratio $$Pr = \frac{P_{ex}}{P_{st}}.$$

The five curves shown comprise data for VGT positions controlled to open positions of 25%, 50%, 62%, 75% and 100%. The same sections in all those curves, identified as 90, 91, 92, 93, 94, 95, and 96, represent different constant rotational speeds of the turbine, respectively, which are defined in Table 1:

TABLE 1

| | Lines of Constant Turbine Speed | | | | | | |
| --- | --- | --- | --- | --- | --- | --- | --- |
| | Line Number | | | | | | |
| | 90 | 91 | 92 | 93 | 94 | 95 | 96 |
| Rotational Speed (rpm/sqrt(R)) | 24900 | 32400 | 39900 | 47400 | 54900 | 62400 | 66900 |

The rotational speed is normalized by the exhaust gas temperature $T_{ex}$ in units of Rankin (R), as is shown in Table 1. In Eq. 3, $\dot{M}_{ex}$, $N_t$, $T_{ex}$, $P_{st}$, $V_P$ are known parameters typically calculated from parameters measured by physical sensors, as previously described.

Solving Eq. 3 in real-time, i.e., during ongoing engine operation, is preferably accomplished by developing a transformed turbine map characterized to have a transformed coordinate system. The transformed coordinate system comprises defining a different coordinate for corrected exhaust mass flow, as shown in Eq. 4, below:

$$x_1 = \frac{\dot{M}_{ex}\sqrt{T_{ex}}}{P_{st}} \quad [4]$$

wherein exhaust flow is corrected by turbine outlet pressure $P_{st}$ instead of turbine inlet pressure. Thus, Eq. [3] can be rewritten as Eq. [5], below:

$$\frac{x_1}{y} = f(y, x_2, x_3), \quad [5]$$

wherein $$y = \frac{P_{ex}}{P_{st}}$$

$$x_2 = V_p, \text{ and,}$$

$$x_3 = \frac{N_t}{\sqrt{T_{ex}}}.$$

Figure 3:
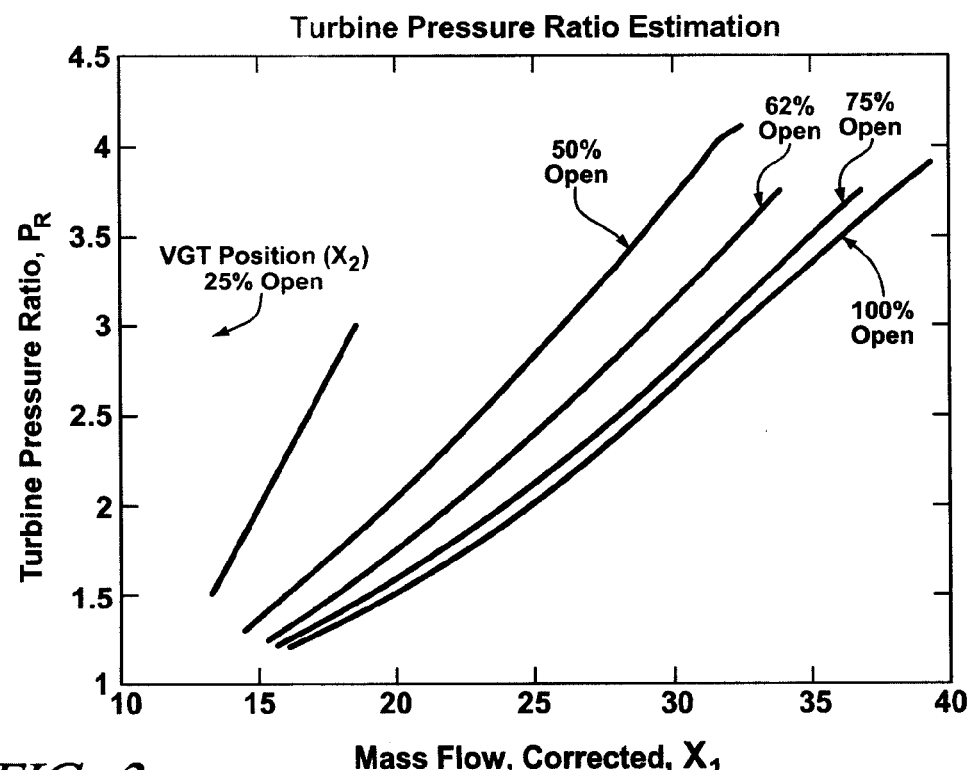

The solution to Eq. [5] yields a one-to-one unique mapping, and thus y has a unique solution based upon $x_1$, $x_2$, $x_3$ which defines a new turbine map through coordinate transformation, as shown in Eq. 6, and demonstrated with reference to FIG. 3:

$$y = P_r = g(x_1, x_2, x_3). \quad [6]$$

The turbine maps depicted in FIG. 2 and FIG. 3, each demonstrate that the effect of turbine speed ($x_3$) is essentially negligible. The revised turbine map appears as a 3-dimensional linear surface which is based upon $x_1$, $x_2$. Therefore, the exhaust pressure is estimated as shown in Eq. 7:

$$\hat{P}_{ex} = P_{st} * g(x_1, x_2, x_3) \quad [7]$$
$$= P_{st} * g\left(\frac{\dot{M}_{ex}\sqrt{T_{ex}}}{P_{st}}, V_p, \frac{N_t}{\sqrt{T_{ex}}}\right)$$
$$\approx P_{st} * g\left(\frac{\dot{M}_{ex}\sqrt{T_{ex}}}{P_{st}}, V_p\right).$$

The exhaust air mass flow can be calculated by Eq. 8:

$$\dot{M}_{ex} = \dot{M}_a + \rho * F_c * RPM * \alpha \quad [8]$$

wherein $\dot{M}_a$ is fresh mass air flow output from sensor 16, ρ comprises fuel density; $F_c$ comprises fueling command measured by volume, in mm³/stroke, and α is a constant relating to the number of cylinders per crank revolution.

When effect of turbine speed, $N_t$, needs to be considered to generate a higher resolution estimate, one can use a compressor map to estimate turbine speed, shown in Eq. 9:

$$N_t = \sqrt{T_{am}} * f\left(\frac{P_{im} + b * \dot{M}_a^2}{P_{am}}, \frac{\dot{M}_a\sqrt{T_{am}}}{P_{am}}\right) \quad [9]$$

Turbine outlet pressure, i.e., stack pressure $P_{st}$, can be calculated from an ambient pressure sensor and a delta pressure sensor of the exhaust aftertreatment system as shown in Eq. 10:

$$P_{st} = P_{am} + \Delta P. \quad [10]$$

Figure 4:
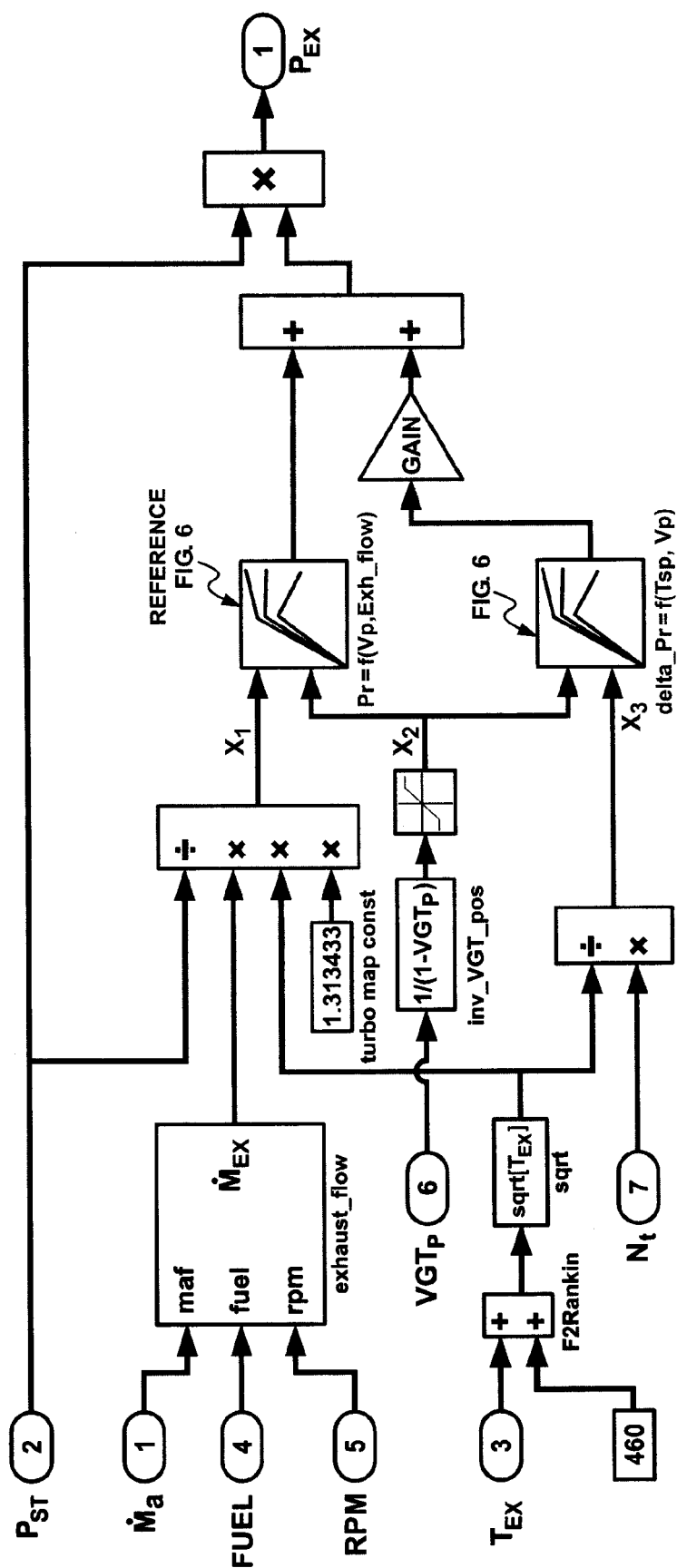
FIG. 4 is a graphical depiction of an algorithmic flowchart, in accordance with the present invention; and, FIGS. 5-10 are graphical data depictions, in accordance with the present invention.
Figure 5:
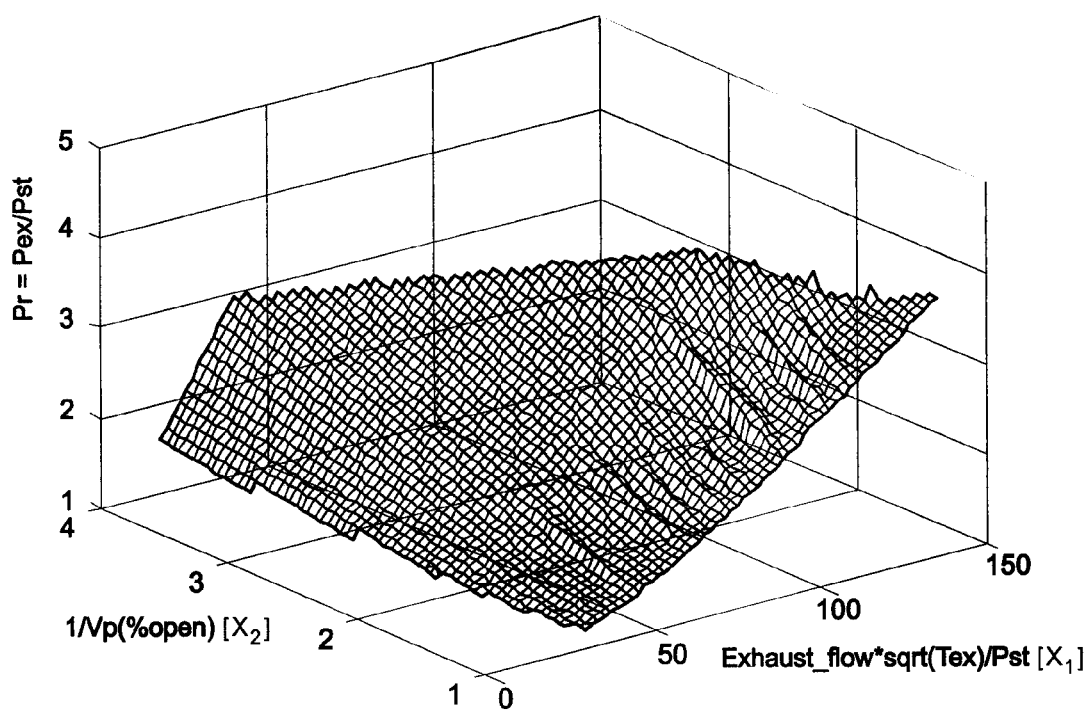
Figure 6:
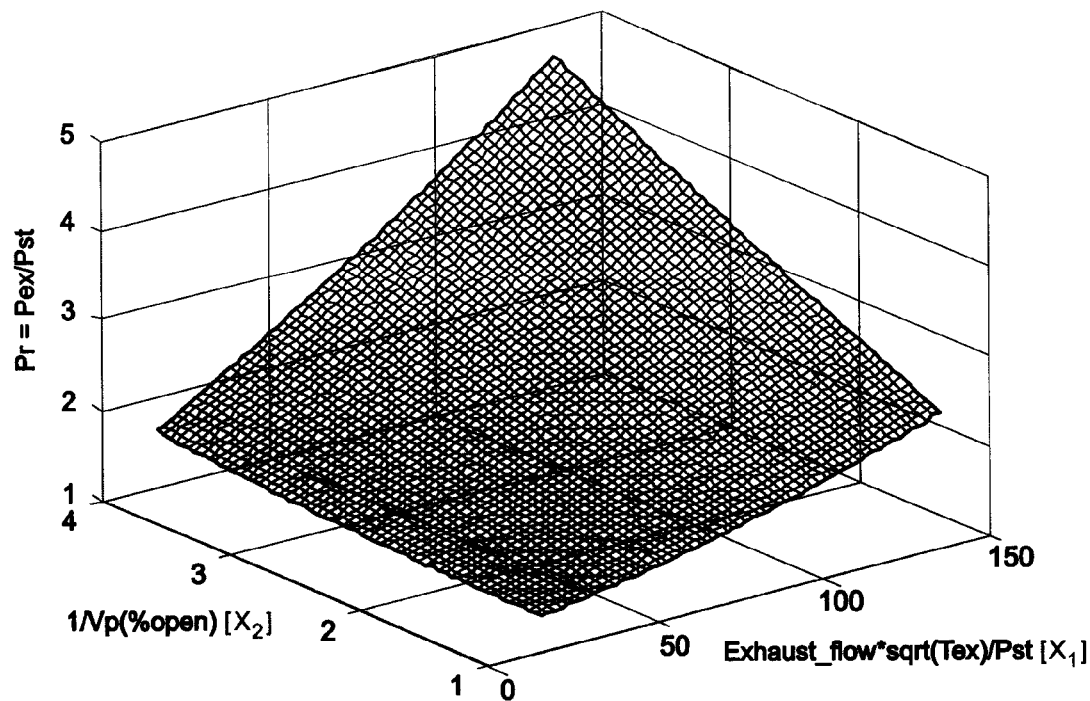

Referring now to FIGS. 4-10, implementation and calibration of the invention on a system is now described. Referring to FIG. 4, an algorithm is developed for implementation in the ECM 5 for real-time execution to determine exhaust pressure, $P_{ex}$. Parametric inputs to the algorithm include: outlet pressure of the turbine, or stack pressure, $P_{st}$; mass air flow, $\dot{M}_a$; fuel flow, FUEL; engine speed, RPM; percent open position of the VGT, $VGT_p$; engine exhaust gas temperature, $T_{ex}$; and turbine speed, $N_t$. A map constant for the turbine (turbo map const) is predetermined during calibration of the system. From these parameters, parametric values for the corrected exhaust flow and the corrected turbine speed are determined, which are used in conjunction with a predetermined map of the turbine to determine a pressure ratio—$P_r$, as shown in FIG. 6, and a change in the pressure ratio. The pressure ratio $P_r$ is multiplied by the stack pressure $P_{st}$ to determine the exhaust pressure, $P_{ex}$.

To implement the algorithm into the ECM 5, it is necessary to understand and account for calibration of the specific intake air compressing device 40 employed in the system, including issues related to normalizing operating parameters including ambient pressure and operating temperature of exhaust gas. The map constant for the turbine 40 (turbo map const), shown having a value of 1.313433, is provided, comprising a correction for a turbine calibration which was made at an ambient temperature of 68 F (22 C) and ambient pressure at 29.92 in. Hg, i.e., sea level.

Furthermore, VGT position may be defined as either percent-open or percent-closed. It is preferable to provide a corrected exhaust air mass flow based upon percent-closed, because turbine pressure ratios increase with increasing percent-closed, thus providing a measure of VGT position proportional to the pressure ratio increase. With reference to FIG.

4, VGT percent closed (VGTp) is translated to Vp, defined as the inverse of VGT percent-open position, as shown in Eq. 11:

$$Vp = 1/(1-VGTp). \quad [11]$$

The factor Vp is equivalent to the definition of the closed position, but has been shown to substantially improve estimation accuracy. When the mass air flow sensor 16 is installed in the inlet to the compressor portion (comp) of the intake air compressing device 40, as shown, time-lag constants are preferably included in calculating exhaust mass air flow to account for time delay in the whole engine air system.

A three-dimensional turbine map for calibration in the ECM is preferably generated by using turbine map data with the aforementioned inputs of exhaust mass airflow, stack pressure, exhaust temperature and percent-open of the VGT, and includes all pressure ratios and the full sweep of VGT positions from minimally open (e.g., 25%) to fully open, to ensure the parametric value for $P_{ex}$, exhaust pressure estimate, is accurate over all engine operating conditions. When turbine map data is not available, turbine map points can be generated using engine testing. The exemplary map, shown with reference to FIG. 5, is extrapolated to the map shown with reference to FIG. 6, using Eq. 12:

$$P_r = f\left(\frac{1}{Vp}, \frac{\dot{M}_{ex}\sqrt{T_{ex}}}{P_{st}}\right). \quad [12]$$

Alternatively, the pressure ratio can be modeled as a second order polynomial as follows, in Eq. 13:

$$\frac{\hat{P}_{ex}}{P_{st}} = a_1 + a_2 * x_1 + a_3 * x_1^2 + a_4 * x_2 + a_5 * x_2^2 + a_6 * x_1 * x_2, \quad [13]$$

wherein:

$$x_1 = \frac{\dot{M}_{ex}\sqrt{T_{ex}}}{P_{st}}, \quad x_2 = \frac{1}{Vp}$$

and the coefficients $a_1, a_2, a_3, a_4, a_5, a_6$, are regressed based upon the turbine map data and/or data generated by operation of an exemplary engine during engine calibration.

Figure 7:
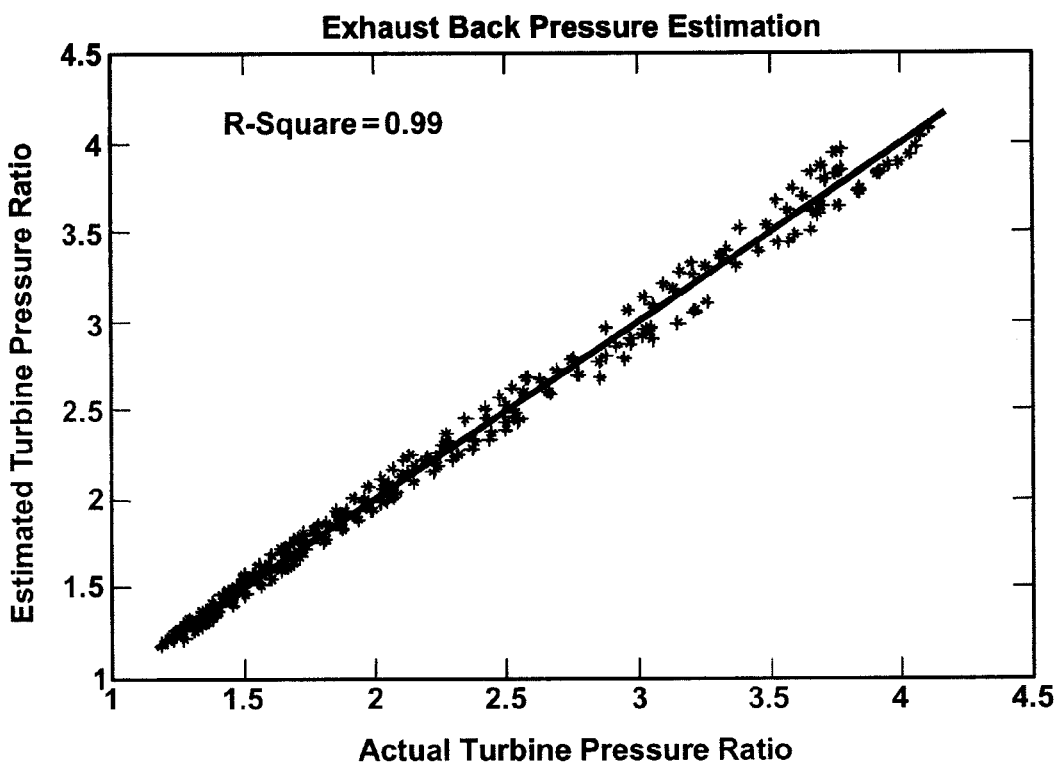

Referring now to FIG. 7, correlation of the estimation from Eq. 13 with the actual measurement from an exhaust pressure sensor is depicted, having a correlation of estimated turbine pressure ratio and measured turbine pressure ratio at 99% correlation.

Figure 8:
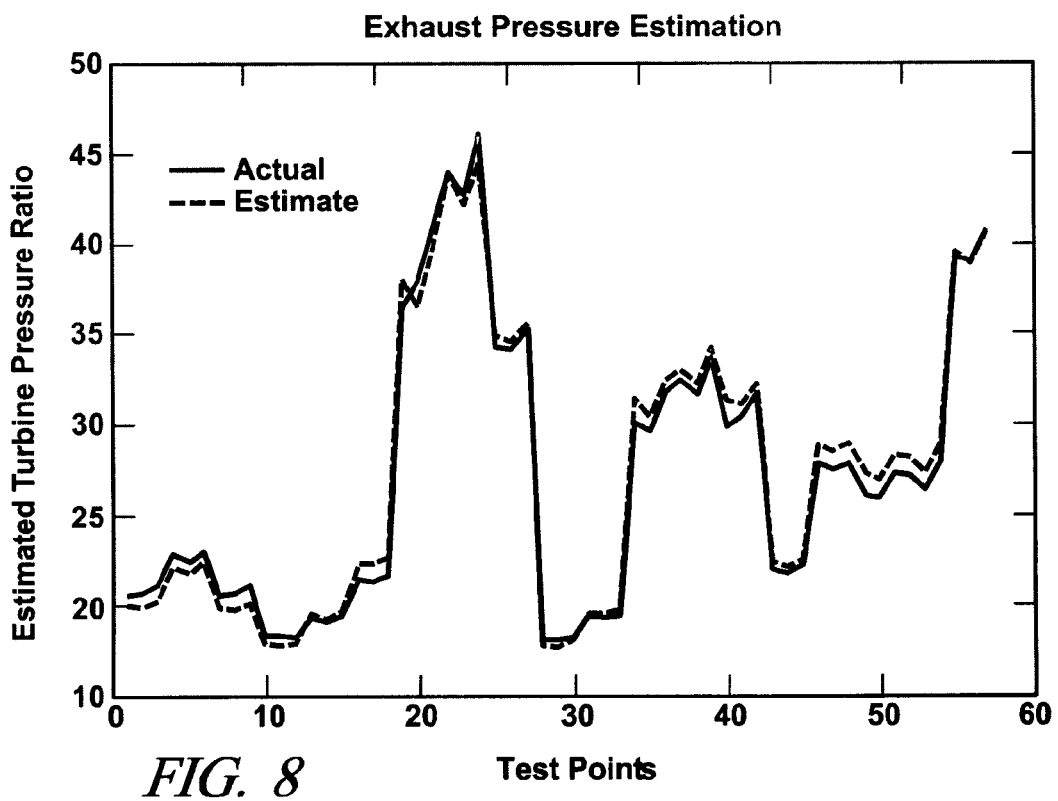
Figure 9:
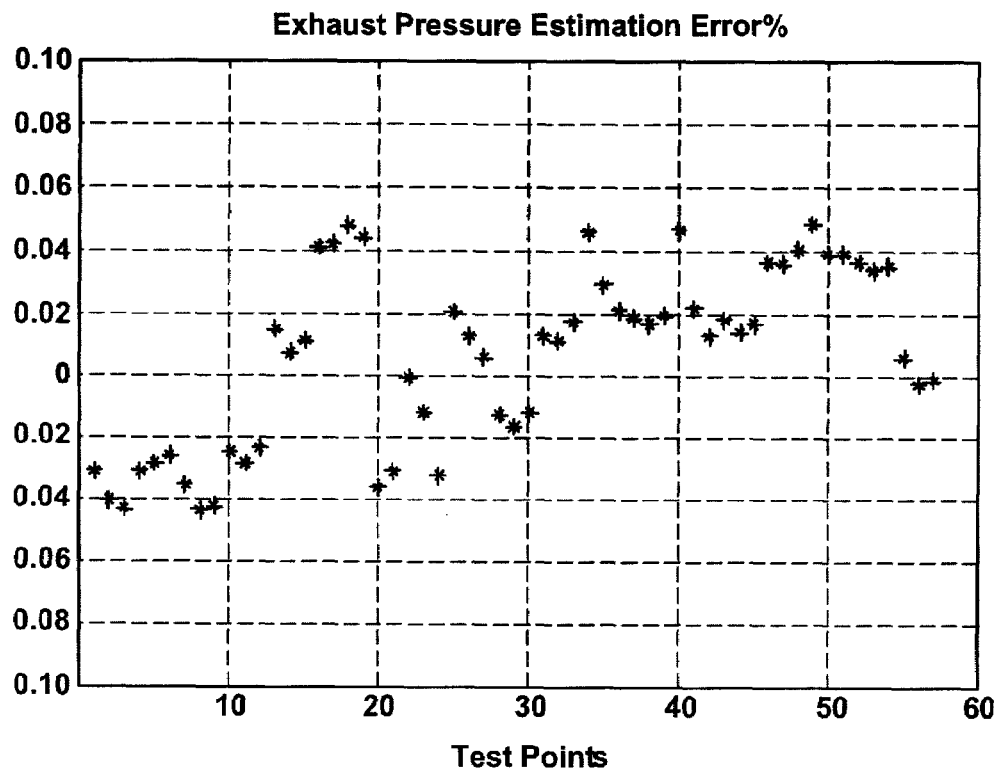
Figure 10:
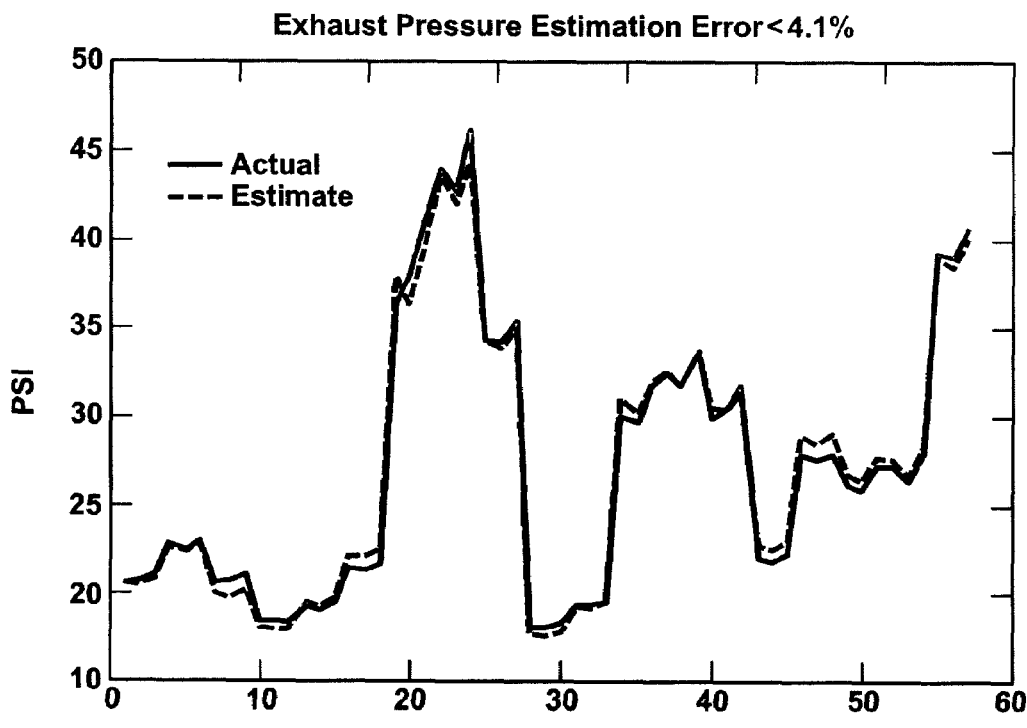

Engine test data were collected from an exemplary diesel engine, with the aforementioned pressure estimator implemented in the ECM. The engine was operated at 1500 and 2500 rpm with a brake mean-effective-pressure (BMEP) ranging from no load to 1500 kPa. Referring now to FIG. 8 validation results of exhaust pressure estimation are shown. The solid line represents measured exhaust pressure from a physical sensor; and the dotted line represents estimated exhaust pressure, measured in units of PSI (pounds per square inch). As shown in FIG. 9, the calculated estimation error is less than 5%. After slightly tuning the constant coefficient of Eq. 13, above, estimation accuracy is further improved, and the estimation error is reduced to less than 4.1%, as shown in FIG. 10.

It is understood that modifications are allowable within the scope of the invention. The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to estimate an exhaust pressure of an internal combustion engine equipped with an intake air compressing device, comprising:
    determining parameters for exhaust flow and opening of the intake air compressing device;
    determining an exhaust pressure ratio based upon the exhaust flow and the opening of the intake air compressing device; and,
    determining exhaust pressure based upon the exhaust pressure ratio.

2. The method of claim 1, wherein determining the parameter for exhaust flow comprises determining a mass of exhaust flow corrected based upon a temperature of the exhaust and a pressure at a turbine outlet of the intake air compressing device.

3. The method of claim 1, wherein determining the exhaust pressure based upon the exhaust pressure ratio further comprises determining the exhaust pressure based upon a pressure at a turbine outlet of the intake air compressing device.

4. The method of claim 1, further comprising determining a rotational speed of the intake air compressing device; and, determining the exhaust pressure ratio based upon the exhaust flow, the exhaust pressure of the intake air compressing device, and the rotational speed of the intake air compressing device.

5. The method of claim 1, wherein determining the exhaust pressure ratio based upon the exhaust flow and the opening of the intake air compressing device comprises determining the exhaust pressure ratio based upon a predetermined calibration map.

6. The method of claim 1, wherein determining the exhaust pressure ratio based upon the exhaust flow and the opening of the intake air compressing device comprises calculating the exhaust pressure ratio with a second-order polynomial equation.

7. Powertrain, comprising:
    an internal combustion engine equipped with a variable geometry intake air compressing device; and,
    a control module:
    adapted to monitor a plurality of sensing devices of the internal combustion engine and control a plurality of actuators; and,
    adapted to execute a plurality of algorithms contained therein to effect the following, the algorithms comprising:
    i) code to determine parameters for exhaust flow and opening of the intake air compressing device;
    ii) code to determine an exhaust pressure ratio based upon the exhaust flow and the opening of the intake air compressing device; and
    iii) code to determine an exhaust pressure based upon the exhaust pressure ratio.

8. The powertrain of claim 7, wherein the control module adapted to execute code to determine an exhaust pressure ratio based upon the exhaust flow and opening of the intake air compressing device comprises code to determine the exhaust pressure ratio based upon a plurality of selectively retrievable predetermined parameters for exhaust pressure ratio stored in tabular format.

9. The powertrain of claim 7, wherein the control module adapted to execute code to determine an exhaust pressure ratio based upon the exhaust flow and the exhaust pressure of the intake air compressing device comprises code to execute a polynomial equation.

10. The powertrain of claim 7, wherein the code to determine the exhaust pressure ratio based upon the exhaust flow further comprises code to correct the exhaust flow based upon an outlet pressure of the intake air compressing device, and engine exhaust gas temperature.

11. The powertrain of claim 7, wherein the code to determine the exhaust pressure based upon the exhaust pressure ratio comprises code to mathematically multiply the exhaust pressure ratio by an outlet pressure of the intake air compressing device.

12. The powertrain of claim 7, wherein the internal combustion engine comprises a compression-ignition engine.

13. The powertrain of claim 7, wherein the internal combustion engine comprises a homogeneous charge compression-ignition engine.

14. The powertrain of claim 7, wherein the internal combustion engine comprises a spark-ignition engine.

* * * * *